United States Patent [19]

Ogawa

[11] 3,748,036
[45] July 24, 1973

[54] EXPOSURE SET UP DEVICE IN A DUPLICATOR

[75] Inventor: Masaya Ogawa, Abeno-ku, Osaka-shi, Japan

[73] Assignee: Minolta Camera Kabushiki Kaisha, Osaka, Japan

[22] Filed: Nov. 20, 1972

[21] Appl. No.: 307,830

Related U.S. Application Data

[63] Continuation of Ser. No. 62,864, Aug. 11, 1970, abandoned.

[52] U.S. Cl. ................................. 355/69, 355/18
[51] Int. Cl. ..................... G03b 27/54, G03b 27/72
[58] Field of Search .................. 355/67, 69, 18, 13, 355/35, 50, 53, 55

[56] References Cited
UNITED STATES PATENTS

| 3,503,677 | 3/1970 | Uchiyama | 355/13 |
| 3,609,037 | 9/1971 | Suyuki | 355/18 X |
| 2,998,548 | 8/1961 | Girand | 355/67 X |
| 3,227,039 | 1/1966 | Simmon | 355/18 |
| 2,763,180 | 9/1956 | Beck | 355/67 |
| 3,397,612 | 8/1968 | Ludoff | 355/67 |
| 2,622,229 | 12/1952 | Lord | 355/69 |

FOREIGN PATENTS OR APPLICATIONS

| 1,004,509 | 3/1952 | France | 355/69 |

*Primary Examiner*—Joseph F. Peters, Jr.
*Attorney*—Watson, Cole, Grindle & Watson

[57] ABSTRACT

The present invention relates to a device for setting up the proper exposure holding the lightness of an object on a photosensitive paper in constant by changing the lightness of the illuminating light source in connection with the change of the duplication magnification, in a duplicator.

1 Claim, 3 Drawing Figures

Patented July 24, 1973

INVENTOR

Masaya Ogawa

BY
Watson, Cole, Grindle & Watson

ATTORNEY

EXPOSURE SET UP DEVICE IN A DUPLICATOR

BACKGROUND OF THE INVENTION:

This a continuation of application Ser. No. 62,864, filed Aug. 11, 1970.

In a projection type duplicator, an original copy and a photosensitive paper are faced to each other at regular intervals, and by means of a projection lens located therebetween the image of said original copy is formed on said photosensitive paper, so that as well known it is possible to change the duplication magnification by moving the projection lens located between the original copy and the photosensitive paper so as to change the distance between said projection lens, and said original copy and photosensitive paper.

However, because the illuminating light source illuminates the original copy from a fixed position relative to said original copy, when the illuminance on said original copy is in constant the illuminance on the image surface is changed by changing the duplication magnification, therefore, by adjusting the duplication magnification the quantity of light received on the image surface, namely, the photosensitive surface should be arranged to be hold in constant.

In the stationary type duplicator in the prior art, by changing the exposure time or changing the diaphragm of projection lens the duplication magnification is adjusted, and in the flow type duplicator, by changing the slit diaphragm on the original copy side or changing the flow speed the duplication magnification is adjusted, therefore, every time the magnification is changed the adjusting members therefor are required to adjust.

Whereas, in the present invention, in the duplicator making use of a flash discharge tube as an illuminating light source for the original copy, a projection lens for setting up the duplication magnification of the duplicator and a member for controlling the discharge voltage impressed in said flash discharge tube are put in connection with each other, and in accordance with the positional adjustment of the projection lens for changing the duplication magnification the discharge voltage is adapted to be changeable in order to obtain a projection type duplicator changeable of the quantity of light or radiation from the flash discharge tube.

According to U.S.A. Patent Ser. No. 872548, dated Oct. 30, 1969, by adjusting the projection lens for changing the duplication magnification of the duplicator, the quantity of light of radiation from the flash discharge tube for illuminates the original copy is in proportion to the value which is the square of the magnification plus 1, and thereby in an optional duplication magnification the duplication in the proper exposure can be effected.

However, in said invention when the duplication magnification is broadly changed the variation of the discharge voltage for lighting becomes remarkable and the exact illumination of the flash discharge tube is hard to be expected.

In the duplicator making use of a flash discharge tube as an illuminating light source and permitting the duplication magnification to change by moving the projection lens, the present invention relates to a duplicator characterized in that by means of a plurality of condensers and a change over member for interlocking with a projection lens moving in accordance with setting up the duplication magnification, said change over member is changed over to connect said a plurality of condensers selectively to the high voltage electric power source and said flash discharge tube in accordance with setting up the duplication magnification, to make it a condenser for lighting the discharge tube, and by changing the capacity of said condenser for lighting said discharge tube the quantity of light of radiation from the flash discharge tube is in proportion to the value which is the square of the duplication magnification plus 1.

The object of the present invention is to allow a flash discharge tube to illuminate in proportion to the value which is the square of the duplication magnification plus 1 in accordance with setting up the duplication magnification broadly changeable, and set up the proper exposure corresponding to the duplication magnification.

Another object of the present invention is to change the capacity of a condenser for discharging to a flash discharge tube in accordance with setting up the duplication magnification, and allow said flash discharge tube to illuminate in accordance with said duplication magnification so as to give the proper exposure for an optional duplication magnification to a photosensitive paper.

Further another object of the present invention is to allow the set up of the exposure of a flash discharge tube corresponding to the duplication magnification to relay on the capacity change of a condenser for lighting the discharge tube, and by changing the discharge voltage thereof effect the fine adjustment of the proper exposure corresponding to the duplication conditions such as the reflection factor of an original copy to be duplicated and the sensitivity of a photosensitive paper.

DESCRIPTION OF THE PREFERRED EMBODIMENT

Figure 1:
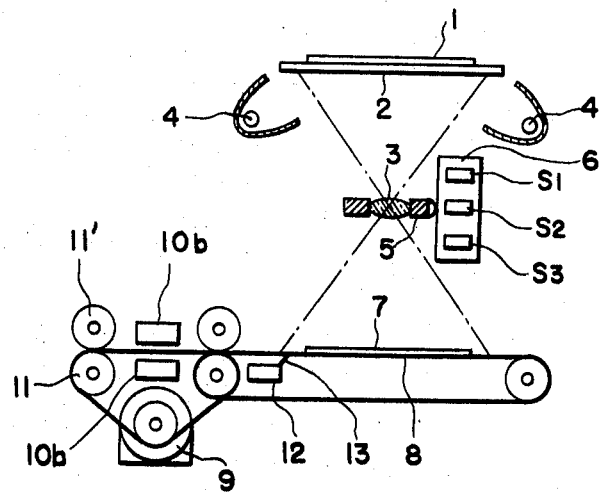
FIG. 1 is a side arrangement plan of an embodiment in accordance with the present invention.

In FIG. 1, original copy 1 is held on original copy holding glass base 2 to be lighted in a moment by flash discharge tube 4 for lighting the original copy, and its image is formed on photosensitive paper 7 on conveyor 8 driven by motor 9 by means of projection lens 3. Being put between original copy transmission rollers 11, 11' said photosensitive paper 7 is carried and charged by charger 10b, and further carried to the image forming portion as described above and thereat exposed by flash discharge tube 4 lit by microswitches 12, 13 and further carried to the developing device not shown in Figs.

Figure 3:
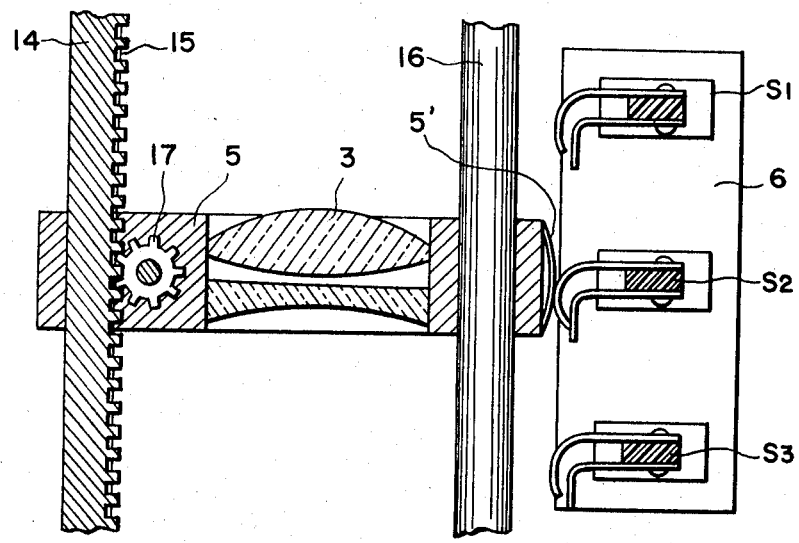
FIG. 3 is an enlarged side view of the switch opening/closing portion in the embodiment shown in FIG. 1.

The magnification of original copy 1 to be formed into an image is changed by moving projection lens 3 up and down. That is, as shown in FIG. 3 said projection lens 3 can be moved up and down by guide rods 14, 16 passing through lens frame 5, and on one side guide rod 14 there is formed rack 15 for meshing with pinion 17 connected by a pin to said lens frame 5, and by turning said pinion 17 the upper or lower position of said projection lens 3 is fixed. On one side of said lens frame 5 working spring 5' is provided. Switch board 6 is provided facing to said working spring 5' and on said switch board 6 there are fixed three switches $S_1$, $S_2$, $S_3$ as shown in FIG. 3, the movable contact pieces of respective switch of $S_1$, $S_2$, $S_3$ being arranged so as to face to said working spring 5' corresponding to the upper or lower position on said lens frame 5, so that, for example, in the case of the equivalent magnification only switch $S_2$ is closed as shown in FIG. 3 and in the case of the double duplication magnification only switch $S_1$ is closed, and further in the case of the half duplication magnification only switch $S_3$ is closed.

Figure 2:
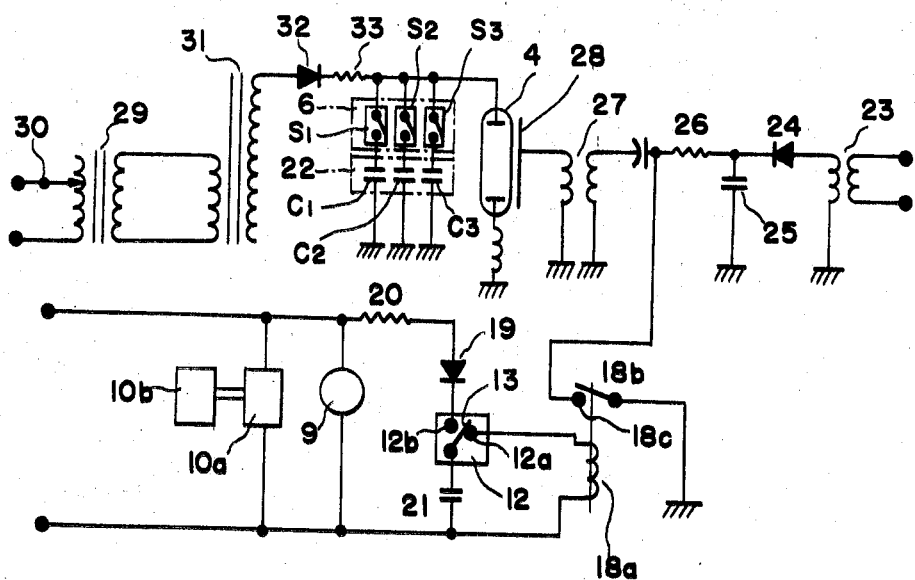
FIG. 2 shows a circuit for lighting the flash discharge tube in the embodiment shown in FIG. 1.

FIG. 2 shows the circuit for lighting flash discharge tube 4, wherein in accordance with determination of said magnification one of three switches $S_1$, $S_2$, $S_3$ is closed. The secondary side of variable transformer 29 connected to the power source through movable contact piece 30 is input to the primary side of transformer 31 for generating the high voltage, and the secondary side of said transformer 31 is connected to one side contacts of said switches $S_1$, $S_2$, $S_3$ and also to flash discharge tube 4 through rectifier 32 and steady resistance 33. And, to the other side contacts of said switches $S_1$, $S_2$, $S_3$ there are connected condensers $C_1$, $C_2$, $C_3$ different in the capacity from each other, and one of said condensers $C_1$, $C_2$, $C_3$ forms condenser 22 for lighting the discharge tube through closing of one of switches $S_1$, $S_2$, $S_3$.

In parallel with said condenser 22 for lighting the discharge tube, to the power source microswitch 12 is connected through high voltage generating device 10a for charger 10b, motor 9 circuit, steady resistance 20, and rectifier 19. There are provided contacts 12a, 12b changed over by actuator 13 of said microswitch 12, and said actuator 13 connected to condenser 21 is ordinarily on the side of contact 12 connected to relay coil 18a. When photosensitive paper 7 moves past above actuator 13, on account of its load said actuator 13 comes into the side of contact 12b to connect said rectifier 19 and accordingly said condenser 21 is charged. And, when said photosensitive paper moves away and is carried to the image forming portion, said actuator 13 is returned to the side of contact 12, and the charging current to condenser 21 runs through relay coil 18a to operate it.

On the other side, to the secondary circuit of transformer 23 connected to the power source trigger condenser 25 is connected through rectifier 24, which is charged, but just as said relay coil 18a is operated relays 18b, 18c are closed and its charge current is discharged through resistance 26, so that transformer 27 is operated and the voltage is induced on trigger electrode 28 of flash discharge 4, and accordingly through closing of one of switches $S_1$, $S_2$, $S_3$ appropriate one of condensers $C_1$, $C_2$, $C_3$ of condenser 22 for lighting the discharge tube connected to flash discharge tube 4 is discharged to light said flash discharge tube 4.

By moving projection lens 3 up and down, just as the duplication magnification is changed the illuminance on the photosensitive surface turns to the following formula:

$$E_c = E_o (\zeta \pi / 4)(1/F(1+\beta)^2)$$

Wherein, $E_o$ denotes the illuminance on the original copy surface, F the F number of projection lens 3, $\zeta$ the permeability of projection lens 3, and $\beta$ the duplication magnification. That is, provided $E_o$, F, and $\zeta$ are a constant respectively the illuminance $E_o$ on the photosensitive surface is proportional to the value which is the square of the duplication magnification plus 1. Therefore, the quantity of light of radiation from the light source is required to be increased in proportion to the value which is the square of the duplication magnification plus 1.

On the other hand, flash discharge tube 4 is lit through the discharge current of condenser 22 for lighting so that the quantity of light of radiation therefrom undergoes a change in accordance with the quantity of the charge energy to condenser 22 for lighting, and said charge energy is $CV^2/2$ provided the capacity of the condenser is C and the charge voltage is V, therefore, by changing the capacity C, the quantity of light of radiation can be changed and the illuminance on the original copy also can be changed to hold the illuminance on the photosensitive surface in constant. For example, the energy required to light per flash discharge tube is 200 joule or so, so that in order to obtain said value the capacity C of the condenser is required to be 100 $\mu$F and the charge voltage is required to be 2KV.

Besides, in the present invention, corresponding to the change of the reflection factor of the original copy caused by exchanging an original copy, the drop of the concentration of developing solution, or the change of the sensitivity of photosensitive paper. Variable tranformer 29 is connected to the primary side of high voltage generating transformer 31 so as to effect the fine adjustment of the quantity of light of radiation by adjusting the voltage V of the condenser for discharging, therefore, by adjusting movable contact 30 it is possible put it to practical use.

By the way, in the aforementioned description said a plurality of condensers can be displaced by a block type condenser which capacity is changeable by changing over. And, in moving projection lens 3 up and down in order to change the duplication magnification, when the defocus of the image can not be covered by the focal depth, the interval between original copy 1 and photosensitive paper can be changed by the well known measure in which a reflector is provided at 45° relative to the optical axis between projection lens 3 and photosensitive paper 7.

I claim:

1. Apparatus for altering the exposure setting in a duplicator, comprising:
   a transparent copy base mounted on the duplicator housing;
   an exposure position within said housing in optical alignment with said transparent copy base;
   a flash discharge tube mounted in said duplicator housing for exposing an original copy on said transparent copy base;
   means for carrying a photosensitive member to said exposure position;
   a plurality of voltage storage elements for energizing said flash discharge tube, each one of said voltage storage elements having a capacity for storing a voltage proportional to the square of the magnification plus one;
   an objective lens movable between said transparent copy base and said exposure position to establish a desired magnification of said original;
   a high voltage electric power source;
   switch means interlocking with the movement of said objective lens for connecting one of said voltage storage elements through said switch to said high voltage electric power source and said flash discharge tube whereby said photosensitive member is exposed in accordance with the square of the magnification plus one;

a high voltage generating transformer for charging said voltage storage elements through said switch means;

a variable transformer connected between said high voltage electric power source and said high voltage generating transformer; and said variable transformer controlling said generated high voltage in accordance with the reflecting power of said original copy and the sensitivity of said photosensitive member.

* * * * *